(12) United States Patent
Barth et al.

(10) Patent No.: US 7,428,973 B2
(45) Date of Patent: Sep. 30, 2008

(54) COLLAPSIBLE CONTAINER WITH FOLDING WALLS AND SPRING LATCHES

(75) Inventors: Christian Barth, Pullach (DE); Richard Kellerer, Feldkirchen (DE)

(73) Assignee: Schoeller Wavin Systems Services GmbH, Pullach (DE)

(*) Notice: Subject to any disclaimer, the term of this patent is extended or adjusted under 35 U.S.C. 154(b) by 757 days.

(21) Appl. No.: 10/506,347

(22) PCT Filed: Feb. 28, 2003

(86) PCT No.: PCT/EP03/02076

§ 371 (c)(1),
(2), (4) Date: Jan. 21, 2005

(87) PCT Pub. No.: WO03/074376

PCT Pub. Date: Sep. 12, 2003

(65) Prior Publication Data

US 2005/0121447 A1    Jun. 9, 2005

(30) Foreign Application Priority Data

Mar. 1, 2002    (DE) ................. 102 08 846

(51) Int. Cl.
*B65D 6/18*    (2006.01)

(52) U.S. Cl. ........................................ 220/7

(58) Field of Classification Search ............. None
See application file for complete search history.

(56) References Cited

U.S. PATENT DOCUMENTS

| 908,988 | A | * | 1/1909 | Forkner et al. | 217/15 |
| 1,809,523 | A | * | 6/1931 | McLean | 206/509 |
| 4,148,407 | A | * | 4/1979 | Sinclair | 220/7 |
| 6,899,242 | B2 | * | 5/2005 | Overholt et al. | 220/7 |

FOREIGN PATENT DOCUMENTS

| EP | 1060999 | 12/2000 |
| WO | WO9611144 | 4/1996 |
| WO | WO9729964 | 8/1997 |

* cited by examiner

*Primary Examiner*—Stephen J. Castellano
(74) *Attorney, Agent, or Firm*—Price, Heneveld, Cooper, DeWitt & Litton, LLP

(57) ABSTRACT

The invention relates to a container, especially a reusable container, comprising collapsible lateral walls (1, 3). The snap-in closure in the corners is configured by a respective pressure lever (4) that can be pressed inward and that interacts with a locating lug (12) that is configured on the lateral wall that is adjacent, arranged diagonally across thereto.

20 Claims, 5 Drawing Sheets

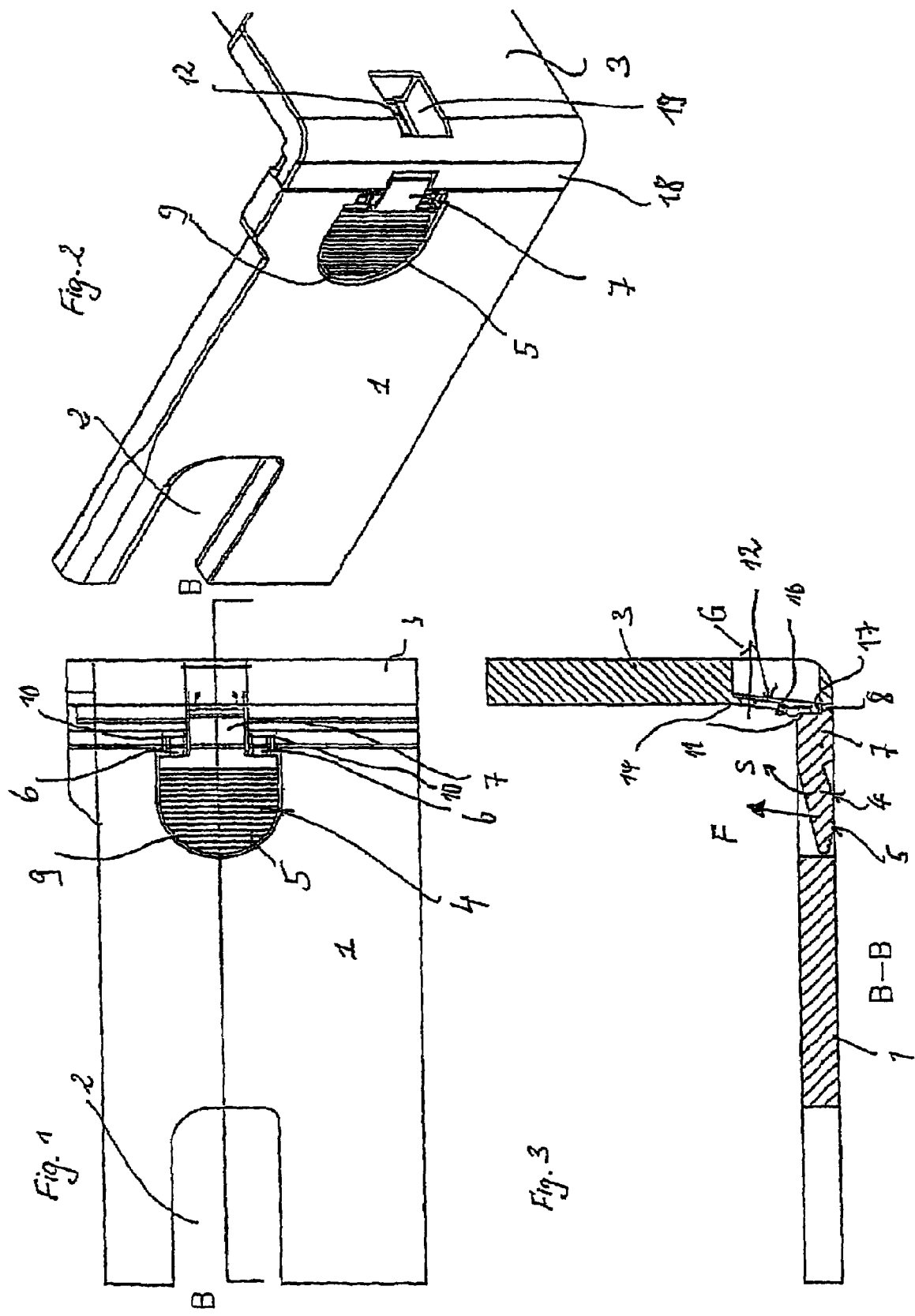

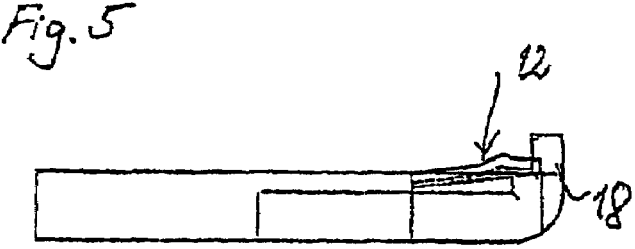
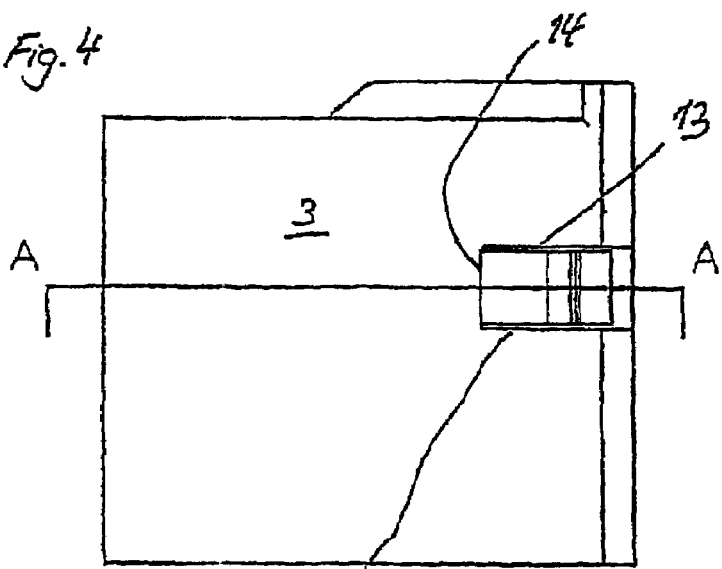
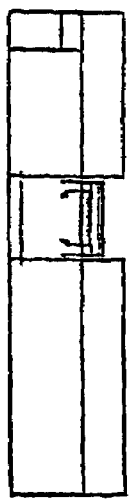
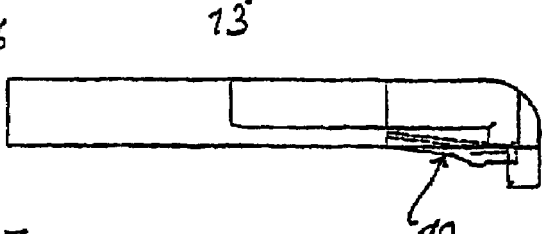
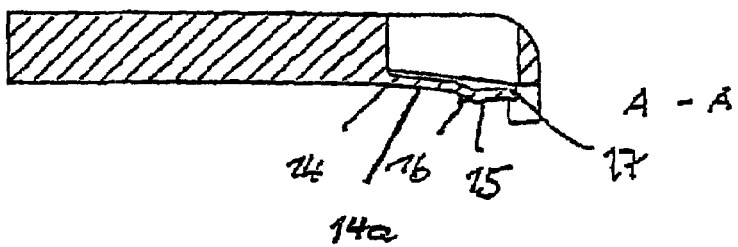

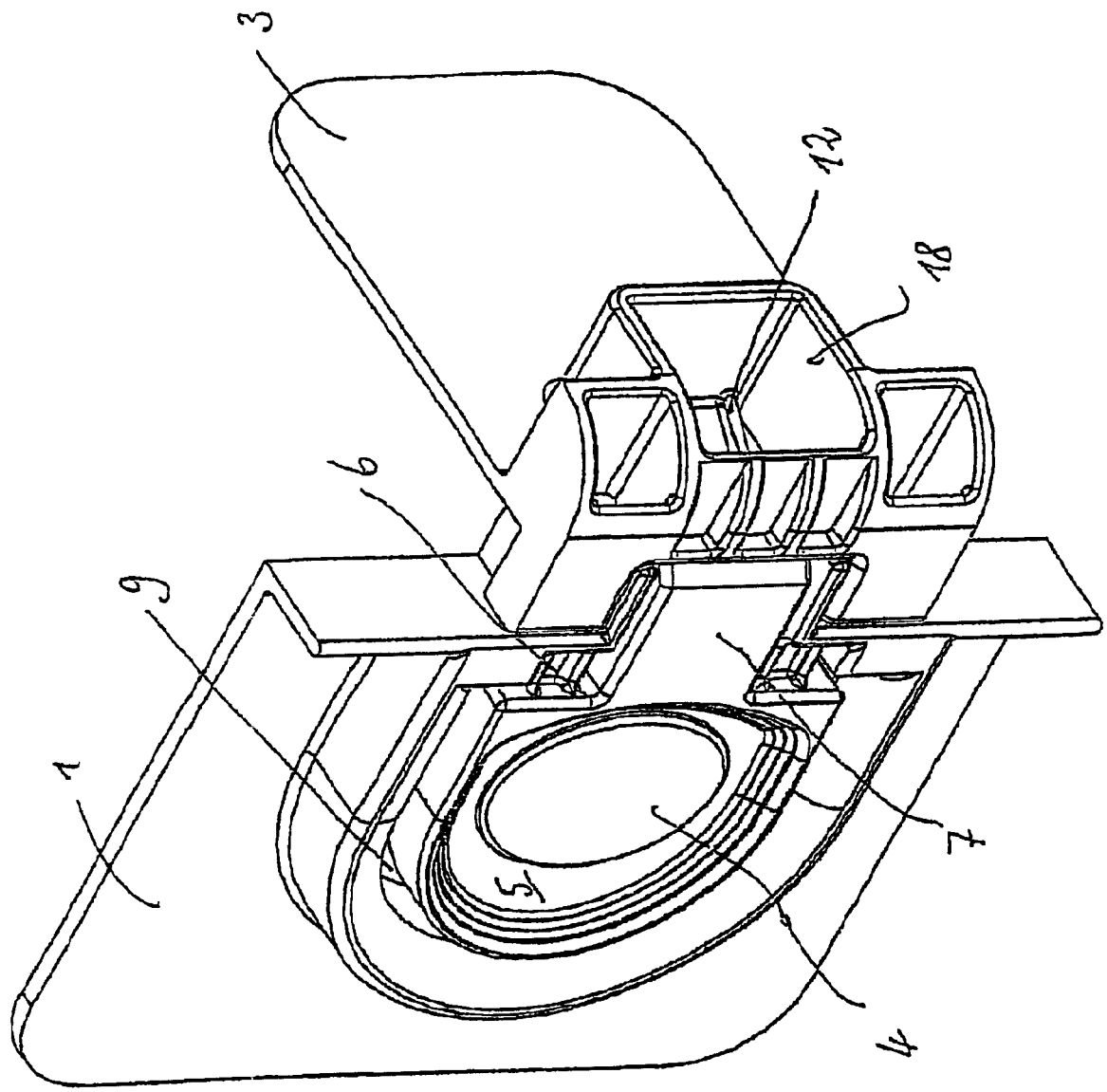

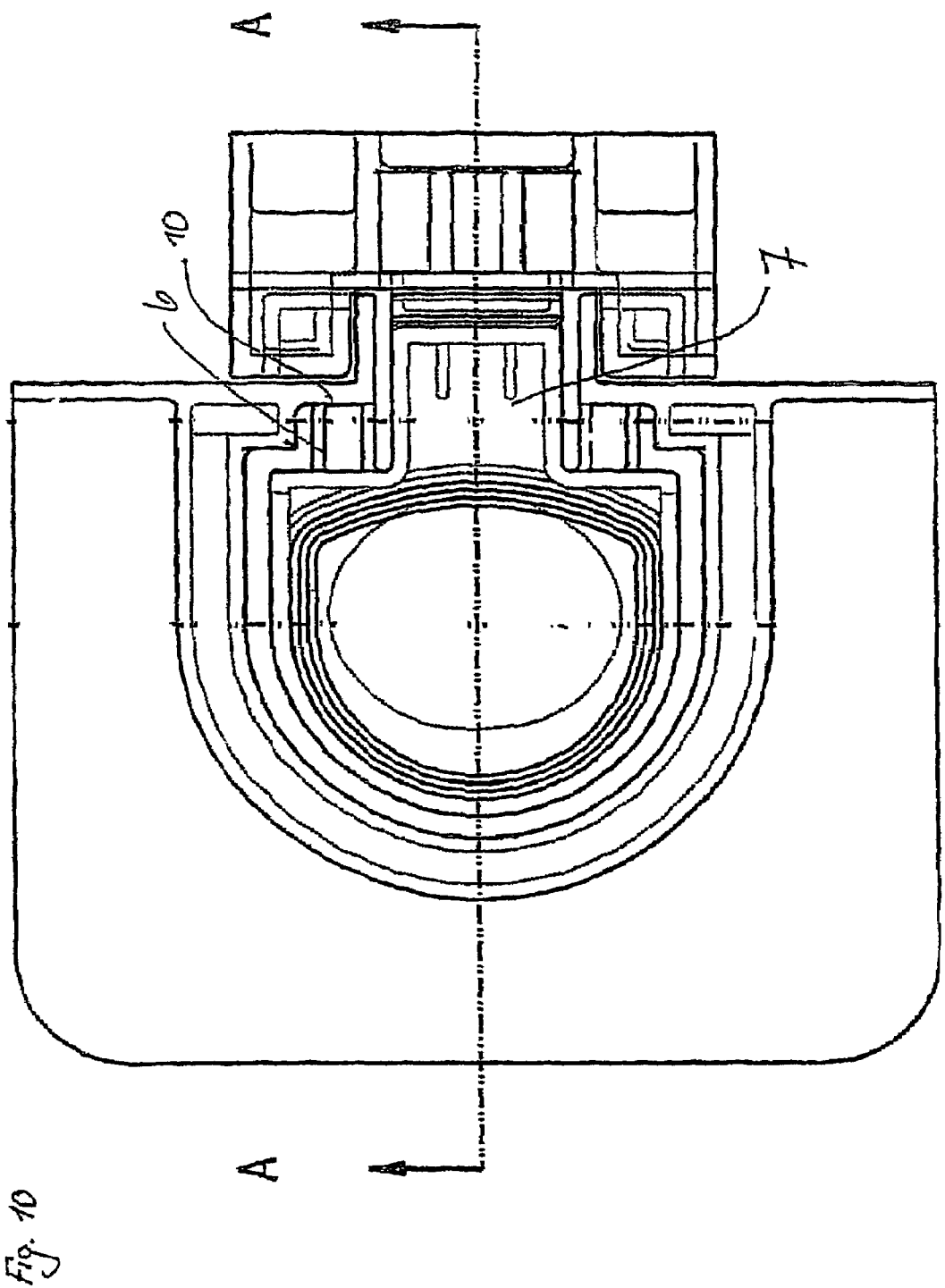

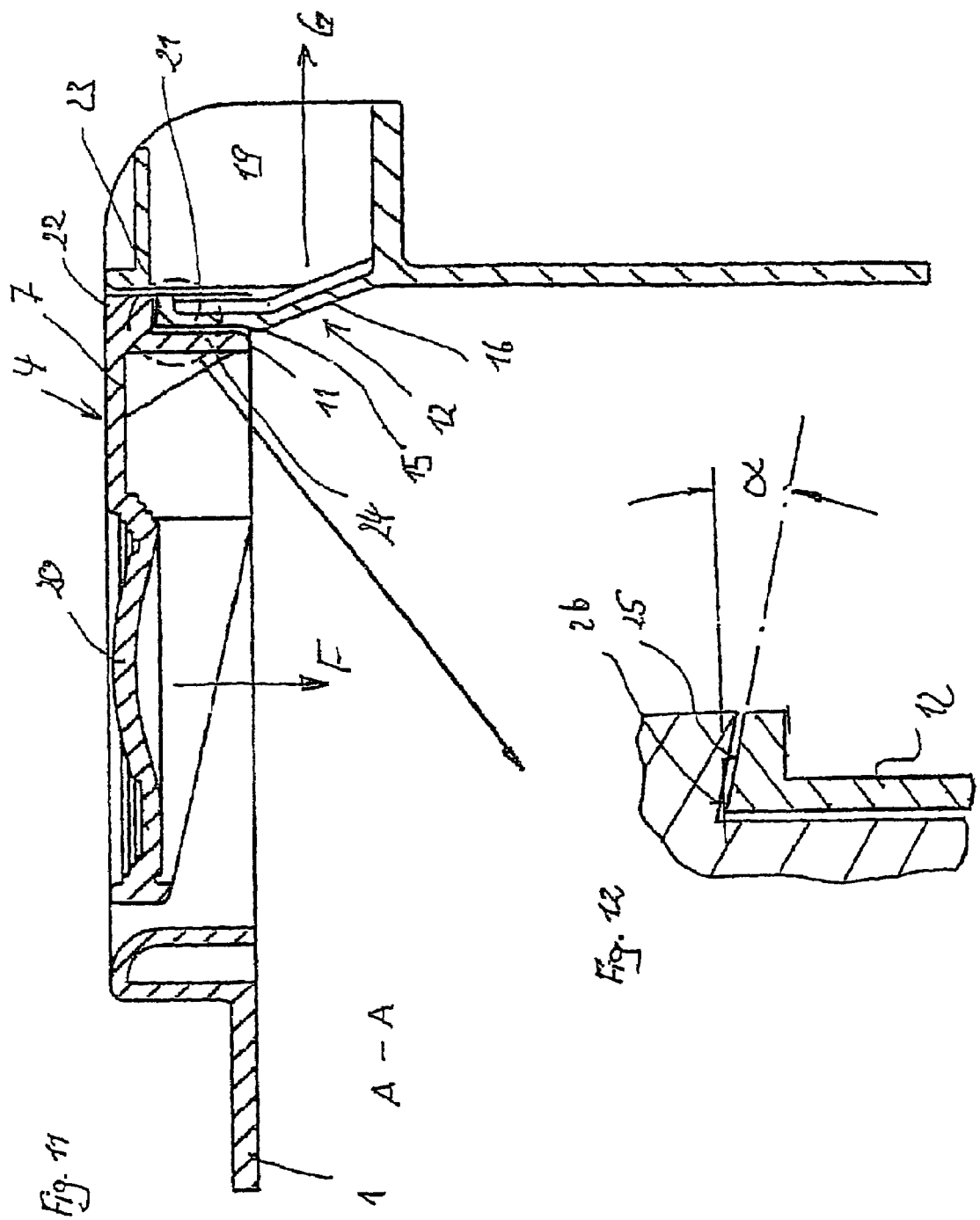

COLLAPSIBLE CONTAINER WITH FOLDING WALLS AND SPRING LATCHES

BACKGROUND OF THE INVENTION

The invention concerns a container, especially a reusable container made of plastic material.

Reusable containers are for the most part provided with collapsible side walls, so that the empty container can be transported with the side walls folded down onto the floor and the smaller volume that is thus produced. Normally such side walls are articulated to the floor of the container by means of linkage hinges or film hinges. In their upright position, the side walls are locked to each other, which is usually done by means of locking elements. To this end, the side walls in contact with each other at an edge are provided with appropriate locking hooks and locking catches that in the upright position engage with each other and thus lock the walls to each other. However, most of the hitherto known constructions (designs) have the drawback that unlocking the box or container is not an easy operation and that in most cases the locking elements have to be separately released by hand, which is very laborious and leads to poor handling of the container. This has negative effects on the commercial and technical acceptability of such containers. To this one has to add the fact that such containers have for the most part to be handled by inexperienced personnel who, whenever the container cannot easily be unlocked, often have recourse to force, so that the locking elements are very quickly destroyed.

It is therefore the task of the invention to create a locking device suitable for a reusable container that will make it possible for the container to be unlocked simply and quickly even by inexperienced personnel, but also assures a reliable and stable locking of the side walls in the upright position.

SUMMARY OF THE INVENTION

According to an aspect of the invention and making reference to the container as seen from a corner, a pressure lever capable of being manually operated is articulated or otherwise supported at the edge of a side wall. This pressure lever is provided with a projecting tongue at the end opposite its gripping part, this tongue being designed both as a locking hook and as a releasing edge, such that the locking hook, when the side walls are in the upright position, acts together (becomes engaged) with the hook of a locking catch of the side wall adjacent at that particular edge. This tongue-like locking catch is provided with a locking protuberance that projects inwards, i.e. into the interior of the container, and is preferably designed as a locking strip. In a further advantageous embodiment, this locking protuberance is joined to a lead-in ramp that runs obliquely from the inner face of the side wall into the interior of the container, where behind the locking protuberance there is provided a section that is set back with respect to the protuberance and at its free end is designed as a locking hook. The spring-like elastic properties of the pressure lever and the tongue-like locking catch are matched to each other. The pressure lever is operated by applying pressure, so that the gripping part of the pressure lever is pressed inwards, which causes a swiveling of the other end of the pressure lever in the terminal region of the tongue, so that the releasing edge arranged there will press the tongue-like locking catch inwards and thus permit the side wall to be folded inwards onto the container bottom. To this end, the tongue-like locking catch is designed to have elastic properties such that it will build up a return force as it is pressed backwards, so that once the side wall has been folded inwards and downwards, the locking catch will return into its original position in which its locking protuberance projects inwards.

When the side wall is raised, the locking hook formed at the free end of the tongue of the gripping part slides along the ramp-like oblique lead-in section and, consequently, will press the locking catch outwards, although the latter will snap back into its inward position as soon as the side wall with the pressure lever has come to be in its upright position. This effects the interlocking, which can however be released again in a very simple manner by appropriate operation of the pressure lever. A further advantage of this catch-type interlock consists of the fact that the pressure lever, given its form and design, will automatically be understood as a release mechanism for the unlocking of the reusable container even by an inexperienced person. To this end, in a very simple and thoroughly automatic manner, the container is gripped in the two corner regions with both hands and with the thumbs pressing on the pressure lever, which causes the unlocking. If the side wall is pressed inwards at the same time, the side wall can be folded back onto the container bottom by means of the same motion that produces the release. The interlocking is likewise obtained in a very simple manner by merely folding the side walls upwards, which automatically produces the interlocking of the walls.

An aspect of the invention is to provide a release of the interlock, i.e. the undoing of the interlock in order to permit the folding down of the side walls, in a very simple manner, while the force that holds the walls in position, i.e. the locking force, is very great and/or can be set to be very great. To this end, it will be advantageous in one embodiment of the invention if the locking catch is designed with a back taper in the region of its front edge and, more particularly, preferably with a front edge that runs obliquely backwards, but where the angle with respect to the horizontal, depending on the particular value of the desired locking force, can be made more or less oblique. Preferably, the undercutting (back taper) angle will lie in the range between 3 and 20°, and even more preferably between 5 and 15°.

The matched elastic properties of the pressure lever and the locking catch can be determined by means of the thickness of the gripping part and the tongue and/or the tongue-like locking catch, the length of the lever, the articulation point and the width of the pressure lever and the tongue-like locking catch.

BRIEF DESCRIPTION OF THE DRAWINGS

Some preferred embodiments of the invention will now be described with the help of the drawing, wherein the various figures show, albeit in a purely schematic representation:

FIG. 1 is a side elevation of the corner region of a reusable container made of plastic material to illustrate the locking device;

FIG. 2 is a perspective view of the corner region shown in FIG. 1 to illustrate the longitudinal side wall and the shorter side wall of the container;

FIG. 3 is a sectional view along the line B-B of FIG. 1;

FIG. 4 a side elevation of the corner region of a reusable container illustrated by FIG. 1 as seen from the side of the shorter side wall;

FIG. 5 is a view of the corner region illustrated by FIG. 4 as seen from below, i.e. from the underside of the reusable container;

FIG. 6 is a view of the corner region illustrated by FIG. 4 as seen from above;

FIG. 7 is a sectional view along the line A-A of FIG. 4;

FIG. 8 is a side elevation of solely the longitudinal wall of the corner region shown in FIG. 4;

FIG. 9 is a perspective view of a part of a corner region of a reusable container of another embodiment, wherein only a small section of the side walls of the reusable container is actually represented;

FIG. 10 is a side elevation of the locking device illustrated by FIG. 9;

FIG. 11 is a sectional view along the line A-A of FIG. 10; and

FIG. 12 is an enlarged representation of the detail indicated by means of a dotted circle in FIG. 11.

DETAILED DESCRIPTION OF THE PREFERRED EMBODIMENT

FIG. 1 shows a side elevation of the corner region of a reusable container made of plastic material, where the shorter side wall, which is only partly represented in the figure, is indicated by the reference number 1. The reference number 2 designates a handling opening in the side wall 1, while the longitudinal side wall adjacent at the corner is indicated by 3. The side wall 1 is part of a reusable container that usually consists of a bottom, which is not shown here, and four side walls that are foldably attached thereto, where in the illustrated embodiment the shorter side wall is designated by 1 the longer side wall by 3. The side walls are arranged in such a way as to be situated opposite each other (not shown) and can be folded in the direction of the container bottom, where the opposite shorter side walls 1 are first folded inwards in the direction of the container bottom, after which the opposite longitudinal side walls 3 are folded in the direction of the bottom, so that the shorter side walls 1 come to lie on the bottom, while the longitudinal side walls 3 come to lie on the shorter side walls that have been collapsed onto the bottom. In the upright position of the side walls illustrated by FIGS. 1 to 3, in which the container is ready to be filled with merchandise, the side walls are locked to each other in the corner region. To this end, pressure levers 4 are arranged or formed on the shorter side walls, in each case in the corner region and/or at the two edges of the shorter side walls. The pressure lever 4, which can be seen in FIG. 1, is provided with a gripping or pressure part 5, which serves to operate the lever, i.e. to release two adjacent side walls. A portion of a hand, the thumb for example, is placed on this gripping part 5 in order to press the pressure lever 4 inwards, as will be described in greater detail further on. In the illustrated embodiment, the pressure lever 4 is connected with the side wall by means of two spaced webs or ribs 6 connected to the side wall and is further provided with a tongue 7 that continues the gripping part 5 in the direction of the corner region and at its end, as can be seen in FIG. 3, is provided with a projecting locking hook designated by the reference number 8. Due to the fact that the gripping part 5 is joined to the side wall by means of at least two webs 6, it is as it were freely contained in a recess or opening 9 in the side wall, the opening being essentially shaped so as to be complementary to the outer edge of the gripping part 5, which it follows with a clearance slot. Due to this free arrangement of the gripping part 5 within the opening 9 and due to the web-like attachment of the pressure lever to the side wall 1, the gripping part 5 can be pressed inwards in the direction of the arrow F, which causes the pressure lever to rotate inwards about the articulation point of the two webs 6 on the side wall 1, as indicated by the swiveling direction S in FIG. 3. The articulation point of the webs 6 is here indicated by 10 (FIG. 1). Consequently, the front edge 11 of the tongue 7 comes to exert pressure on a tongue-shaped locking catch, here indicated by 12, that is formed on the longitudinal side wall 3 (FIG. 3). This tongue-like locking catch 12, which can also be seen in greater detail especially in FIGS. 4 and 7, is such as to be provided on both sides with a clearance slot 13 with respect to the longitudinal side wall 3 and in the illustrated embodiment is integrally attached to the longitudinal side wall 3 at 14. The reference number 14 here serves as an articulation point about which the tongue-like locking catch 12 can be pressed outwards in the direction of the arrow G from the position shown in FIG. 3.

As can be seen from FIGS. 3 and 7, the tongue-like locking catch 12 is provided with a shoulder 14a that runs inwards, especially obliquely inwards, and terminates with a locking strip 15, the forward free end of the locking catch 12 being situated further outwards than this locking strip 15. The tongue-like locking catch 12, which projects forward and is free within the side wall, is elastic in the manner of a spring and capable of being pressed in the direction of the arrow G about the articulation point 14, i.e. its joint with the side wall 3, but, as soon as the pressure is removed, will spring elastically inwards and, more precisely, back into the position illustrated by FIG. 3, in which the locking strip 15 is situated further inwards with respect to the reusable container. The degree of the elasticity and/or the spring effect is essentially determined by the thickness and the width of the locking catch 12 and/or the design of the articulation point 14. In this connection, the springy locking catch 12 has its spring effect preferably set in such a manner that, as it were, it can be pressed outwards in the direction G even by hand, albeit with a certain pressure. This makes it possible for the spring characteristic and/or the elasticity to be determined and set by means of appropriate dimensioning of the locking catch 12.

As a result thereof, one obtains a very advantageous interaction between the pressure lever and the tongue-like locking catch 12. When the reusable container with its upright side walls is to be collapsed, the reusable container is gripped with the body of the hand at the two corner regions, i.e. to the left and the right of the shorter side, pressing, for example, with the thumb on the gripping part 5, so that the pressure lever becomes pressed in the direction F and therefore swiveled inwards in the direction of the arrow S. Consequently, the forward edge 11 of the pressure lever will press against the locking catch 12 and, more precisely, in the embodiment here illustrated immediately behind the projecting locking strip 15, so that the locking catch 12 will be pressed outwards in the direction of the arrow G, thus allowing the side wall 1, to be rotated along line F and therefore be collapsed. Once the side wall 1 has been folded down in the direction of the container bottom, the locking catch 12 springs back into its original position and the side wall 3 can be folded without further problems in the direction of the container bottom and will come to lie on the shorter side wall 1. When the reusable container has to be prepared for service, the two longitudinal side walls 3 are first pulled or folded upwards, after which the two shorter side walls 1 are folded upwards, which causes the closure hooks 8 to come into contact with the tongue-like locking catch 12 and, since they slide along the oblique parts 16, the elastic locking catch 12 will be swiveled about the articulation point 14 in the direction of the arrow G until the locking hook 8 eventually snaps and/or grips behind the free and hook-shaped end 17 of the locking catch 12, which will cause the locking catch 12 to spring inwards, in the direction opposite to the arrow G. The locking position as shown in FIG. 3 is thus reached. The release and the locking are obtained in a simple manner by hand and, more precisely, by means of an almost automatic movement of the hand with the folding or collapsing of the container and/or the uprighting of the side walls without any other action having to be taken. A very rapid and simple release and locking is thus obtained, which is made possible by the interaction between the elastically operated pressure lever and the locking catches 12 made to project inwards by the oblique sliding plane 16 and the catch 11, where the locking catch 12 becomes correspondingly displaced in the direction of the arrow G and given its elastic return capacity, will thereafter always spring back into its initial or rest position and thus assure a safe and stable locked joint with the hook of the pressure lever. Unlike what happens in the case of conventional containers, where comparable locking hooks and/or locking catches in the longitudinal side walls are stiff and/or substantially rigid and the release becomes very difficult, because each individual closing hook has to be bent away by applying considerable pressure, which can lead to the destruction of the closure mechanism, according to the invention it is possible to perform the release and locking process in a very simple manner. The pressure lever acts almost as an instruction leaflet for the release movement, because one will be automatically led to press with the thumb on the gripping part 5 when one wants to collapse the side wall 1, so that the swiveling of the release mechanism is initiated by the pressing in and/or out of the locking catch 12 in the direction of the arrow G.

It is self-evident that by means of appropriately designed stop strips on the enveloping edge 18 of the longitudinal side wall 3, the raised shorter side wall 1 is maintained in its upright position, i.e. cannot be pressed outwards beyond its upright position. But such stop strips form part of the prior art, so that—with a view to simplifying the representation—there is no need here either to describe them or to show them on the drawings. In FIG. 2, there can be seen the opening 19 within which the freely projecting locking catch 12 is provided. As an alternative to designing both the pressure lever and the locking catch 12 as integral parts of their respective side walls, as here shown, they may also be designed as separate components and then attached to the respective side walls 1 and 3 by means of clipping, plugging or the like. In particular, it will also be advantageous if these components are made to have some other color, which further enhances their signaling effect as a release element.

FIGS. 9 to 11 illustrate a further embodiment of a comparable locking device, though only parts of the side walls 1 and 3 are actually shown. Identical components in these figures are always indicated by the same reference numbers. FIG. 10 illustrates how the pressure lever 4 is integrally joined to the side wall, more precisely, by means of the narrow strips or webs 6, which—as shown in FIG. 10—may also be designed as a shallow U-section. In place of the U-shaped design, however, it is also possible to provide two narrowly spaced rib-like webs or also several webs.

The structure of the pressure lever 4 and the locking catch 12 is illustrated particularly well by the section view of FIG. 11. In the representation of FIG. 11 the pressure lever 4 is provided with a slight elevation or curvature 20 as the gripping part onto which the thumb has to be placed when operating to release the side wall. As an element that triggers the release, the front edge 11 is designed at the free end of a web 24 that projects at right angles from the tongue 7 and projects into the interior of the container, so that the release element acts in the manner of a lever on the locking catch 12, which, following a slight pressure exerted on the pressure lever 4, will be pressed in the direction of the arrow G, so that the side wall 1 can be folded inwards, passing the sufficiently deflected locking catch on the way. Due to the lever advantage, this can be done by exerting only a small force. When the pressure lever 4 is pressed in the direction F, the front edge 11 will accordingly be pressed against the part—here indicated by 21—of the locking catch that is set back with respect to the locking strip 15, so that the tongue-like locking catch 12 is pressed outwards in the direction G and, more precisely, in the direction of the opening 19. Consequently, the side wall 1 can be folded inwards in the direction of the arrow F and onto the container bottom. When the side wall 1 is raised, the opposite edge 22 of the pressure lever will run along the oblique surface 16 of the locking catch 12, which surface projects in the manner of a ramp, so that the locking catch 12 will be pressed back into the opening 19, after which the side wall 1 can be brought into its upright position. As soon as the front edge 22 has run past the locking catch 12, the locking catch will spring back inwards and, more precisely, in the direction opposite to the arrow G, so that the interlocking is obtained by means of the engagement of the tongue 7 with the locking hook provided at the free end of the tongue-like locking catch 12. By means of appropriate design of the thickness of the articulation point 14, the length of the tongues and the pressure lever, it is possible to determine the release force and also the elastic characteristics, where the conditions within the interlock have to be so matched to each other that especially the locking catches 12 are preferably designed so as to spring elastically forward in such a manner that even manually they can easily be pressed into the opening 19 and yet oppose sufficient resistance to confer an adequate return capacity upon them, so that they will jump back into the position shown in FIG. 11 in which the side walls are stably interlocked.

According to the embodiment illustrated by FIG. 12, which represents an enlarged view of the detail indicated by the dotted circle of FIG. 11, the value of the locking force can be set by designing the front face 25 of the locking catch 12 with a back taper, the back taper being obtained by means of an oblique position of the front face 25. In the illustrated embodiment the back taper angle $\alpha$ amounts to 12° and, in particular, may lie in the range between 3 and 20°, preferably between 5 and 15°. The opposite face 26 is designed in a corresponding manner and, more precisely, to be complementary with the front face 25, i.e. with a similar back taper angle. This design does not exert any negative effects on the release, i.e. the unlocking, rather, the locking catch can be easily swiveled into the opening 19 when the pressure lever is operated, so that an easy release is obtained. Due to the back taper, however, the locking force will be very considerable, so that unintentional opening without operating the pressure lever is not possible.

The invention claimed is:

1. A reusable container comprising a container bottom and side walls that are attached thereto in an articulated manner and can be folded down in the direction of the container bottom, so that the side walls can be folded down onto the container bottom for transport and storage when the container is empty and locked to each other when they are in the upright position, wherein interlock devices on at least one side wall comprise a pressure lever that can be folded down in a direction towards the container bottom, the pressure lever being provided with a locking hook that, when the side walls are in the upright position, overlaps with a locking hook of a locking catch on the side wall adjacent to the at least one side wall in order to interlock the side walls, wherein the locking catch in the side wall includes spring-like elastic characteristics and locking protuberance that projects inwards from an interior face of the adjacent side wall as to assure that the locking catch will build up an elastic return force when it is pressed outwards due to rotation of the pressure lever.

2. A container in accordance with claim 1, wherein the pressure lever is provided with a gripping part including a tongue having an inner edge that acts as a releasing edge that makes contact with a part of the adjacent side wall that is set back with respect to the locking protuberance of the locking catch.

3. A container in accordance with claim 2, wherein the locking catch includes a locking strip.

4. A container in accordance with claim 3, wherein the locking catch includes a lead-in ramp that runs obliquely inwards.

5. A container in accordance with claim 4, wherein the lead-in ramp connects with the locking strip and/or the locking protuberance.

6. A container in accordance with claim 3, wherein the locking catch is provided at its free end with a section that is set back with respect to the locking strip and/or the locking protuberance.

7. A container in accordance with claim 6, wherein the free end of the locking catch is designed as a hook.

8. A container in accordance with claim 2, wherein the pressure lever is joined to the side wall in an articulated manner by means of two narrow webs.

9. A container in accordance with claim 8, characterized in that a tongue of the pressure lever extends between the narrow webs.

10. A container in accordance with claim 8, wherein the webs on the side wall define an articulation point that constitutes a center of rotation of the pressure lever.

11. A container in accordance with claim 10, wherein the articulation point comprises a dome-shaped pressing part.

12. A container in accordance with claim 2, wherein the inner edge protrudes inwards as compared with the pressure lever and the tongue.

13. A container in accordance with claim 2, wherein the releasing edge is constituted by the free end of a web that projects in a substantially orthogonal direction.

14. A container in accordance with claim 1, wherein the locking catch comprises a resilient tongue within an opening of the side wall and with its edges delimits a narrow slot between it and the side wall on both sides.

15. A container in accordance with claim 1, wherein the locking catch has its spring-like elastic characteristics determined by a length of the tongue, thickness of the tongue, a width of the tongue and/or a thickness of an articulation point between the tongue and the side wall.

16. A container in accordance with claim 1, characterized in that a spring force of the locking catch is matched with the pressure lever in such a manner that when the pressure lever is rotated, the locking catch will be pressed outward to release an interlock of the locking catch and the pressure lever.

17. A container in accordance with claim 1, characterized in that a free end of the pressure lever comprises locking catch that engages with the locking hook and the locking catch in an upright position.

18. A container in accordance with claim 1, wherein a front edge of the locking catch is designed with a back taper for interlocking with a protruding edge of the pressure lever.

19. A container in accordance with claim 18, wherein the back taper tapers at an angle between 3° and 20° and that an edge of the pressure lever with which it interlocks is designed with a complementary oblique face.

20. A container in accordance with claim 19, wherein the back taper tapers at an angle of between 5° and 15°.

* * * * *